United States Patent
Gibeau et al.

(10) Patent No.: US 9,337,680 B2
(45) Date of Patent: May 10, 2016

(54) METHOD AND SYSTEM FOR CONTROLLING AN ELECTRIC VEHICLE WHILE CHARGING

(71) Applicant: Ford Global Technologies, LLC, Dearborn, MI (US)

(72) Inventors: John Paul Gibeau, Canton, MI (US); Jeffery R. Grimes, Canton, MI (US); Neil Robert Burrows, White Lake Township, MI (US); James Lawrence Swoish, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

(21) Appl. No.: 13/794,996

(22) Filed: Mar. 12, 2013

(65) Prior Publication Data

US 2014/0266038 A1    Sep. 18, 2014

(51) Int. Cl.
*H02J 7/00* (2006.01)
*H02J 7/04* (2006.01)
(Continued)

(52) U.S. Cl.
CPC ............... *H02J 7/007* (2013.01); *B60L 1/003* (2013.01); *B60L 1/02* (2013.01); *B60L 3/0046* (2013.01); *B60L 11/14* (2013.01); *B60L 11/1816* (2013.01); *B60L 11/1824* (2013.01); *B60L 11/1861* (2013.01); *B60L 11/1866* (2013.01); *B60L 11/1868* (2013.01); *B60L 11/1872* (2013.01); *B60L 11/1874* (2013.01); *B60L 11/1875* (2013.01); *B60L 15/20* (2013.01); *H01M 10/425* (2013.01); *H01M 10/443* (2013.01); *H01M 10/486* (2013.01); *H01M 10/6571* (2015.04); *H01M 10/663* (2015.04); *B60L 2210/10* (2013.01); *B60L 2210/40* (2013.01); *B60L 2230/22* (2013.01); *B60L 2230/24* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/545* (2013.01); *B60L 2240/547* (2013.01); *B60L 2240/549* (2013.01); *B60L 2250/24* (2013.01); *H01M 2220/20* (2013.01); *Y02T 10/645* (2013.01); *Y02T 10/70* (2013.01);
(Continued)

(58) Field of Classification Search
CPC ......... H02J 7/047; H02J 7/007; B60L 11/187; B60L 11/1864
USPC ......................................... 320/112, 150, 152
See application file for complete search history.

(56) References Cited

U.S. PATENT DOCUMENTS

| 7,230,404 | B2 * | 6/2007 | Kimoto ............... | H01M 2/1077 320/150 |
| 7,940,028 | B1 * | 5/2011 | Hermann ............ | H01M 16/006 320/104 |

(Continued)

*Primary Examiner* — Richard V Muralidar
(74) *Attorney, Agent, or Firm* — David B. Kelley; Brooks Kushman P.C.

(57) ABSTRACT

A vehicle includes a traction battery having a thermal circuit, and a controller. The controller is configured to: (i) charge the traction battery using a maximum charging current defined by the lowest temperature cell while the traction battery is connected to the charger, and (ii) heat the traction battery if the lowest temperature cell is below a predetermined temperature while the traction battery is charging. A method for controlling an electric vehicle while connected to a charger includes charging the battery using a first portion of power from the charger while heating the battery using a second portion of power from the charger in response to a low cell temperature in a traction battery.

18 Claims, 4 Drawing Sheets

(51) Int. Cl.

| | | |
|---|---|---|
| *B60L 11/18* | (2006.01) | |
| *H01M 10/44* | (2006.01) | |
| *H01M 10/48* | (2006.01) | |
| *B60L 1/00* | (2006.01) | |
| *B60L 1/02* | (2006.01) | |
| *B60L 3/00* | (2006.01) | |
| *B60L 11/14* | (2006.01) | |
| *B60L 15/20* | (2006.01) | |
| *H01M 10/42* | (2006.01) | |
| *H01M 10/663* | (2014.01) | |
| *H01M 10/6571* | (2014.01) | |

(52) U.S. Cl.
CPC ......... *Y02T 10/7005* (2013.01); *Y02T 10/7044* (2013.01); *Y02T 10/7061* (2013.01); *Y02T 10/7066* (2013.01); *Y02T 10/7077* (2013.01); *Y02T 10/7088* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/14* (2013.01)

(56) References Cited

U.S. PATENT DOCUMENTS

| | | | |
|---|---|---|---|
| 2006/0028167 A1 | 2/2006 | Czubay et al. | |
| 2010/0292855 A1 | 11/2010 | Kintner-Meyer | |
| 2011/0043165 A1 | 2/2011 | Kinser et al. | |
| 2011/0191220 A1* | 8/2011 | Kidston et al. | 705/34 |
| 2012/0261397 A1* | 10/2012 | Schwarz et al. | 219/202 |
| 2012/0318783 A1* | 12/2012 | Kamachi | 219/497 |
| 2013/0175022 A1* | 7/2013 | King et al. | 165/202 |
| 2013/0234648 A1* | 9/2013 | Kelty et al. | 320/106 |

\* cited by examiner

METHOD AND SYSTEM FOR CONTROLLING AN ELECTRIC VEHICLE WHILE CHARGING

TECHNICAL FIELD

Various embodiments relate to a method and a system for controlling an electric vehicle while connected to an external power source.

BACKGROUND

Vehicles such as battery electric vehicles (BEV) and hybrid electric vehicles contain a traction battery, such as a high voltage battery, to act as an energy source for the vehicle. The battery chemistry and performance may change depending on the temperature of the battery. For example, the battery may have a limited or restricted rate of charging and/or a reduced capacity when the battery temperature decreases or falls below a given temperature. This temperature may be cell chemistry or technology dependent, and for many batteries may be encountered in an automotive environment, such as during cold winter environmental temperatures in North America or Europe. If the battery has a reduced capacity, that state of charge of the battery is also reduced, and the vehicle range is reduced. Also, by having a restricted rate of charging, the time to charge the battery may by lengthy. These temperature limitations on the battery may cause the vehicle to not meet user expectations.

SUMMARY

In an embodiment, a vehicle is provided with a traction battery having a plurality of cells, a thermal circuit connected to the traction battery, and a controller. The thermal circuit has a thermal source and a thermal sink. The controller is connected to the traction battery and the thermal circuit. The controller is configured to: (i) charge the traction battery using a maximum charging current based on the lowest temperature cell while the traction battery is connected to a charger and external power source, and (ii) heat the traction battery if the lowest temperature cell is below a predetermined temperature while the traction battery is charging.

In another embodiment, a method of controlling an electric vehicle is provided. The method detects if a traction battery is connected to a charger and external power source. Cell temperatures in the battery are measured to determine a lowest temperature cell. The traction battery is charged using a maximum charging current associated with the lowest temperature cell while the traction battery is connected to the charger and external power source. The traction battery is heated using a current equal to the difference between a maximum available current from the charger and the maximum charging current if the lowest temperature cell is below a predetermined temperature while the traction battery is charging.

In yet another embodiment, a method for controlling an electric vehicle while connected to a charger is provided. In response to a low cell temperature in a traction battery, the battery is charged using a first portion of power from the charger while the battery is heated using a second portion of power from the charger. The first portion and second portions vary in response to the low cell temperature.

Various embodiments have associated, non-limiting advantages. For example, a controller arbitrates the heating and charging a battery based on input charge available and the state of the battery. The controller determines the portion of energy to be used for charging the battery and the portion of energy to be used for heating the battery based on the battery temperature. A control algorithm may optimize the balance of energy directed to charging the cells and the energy directed to heating the cells to maximize energy into the cells of the battery. As the battery is heated, a larger portion of energy from the charger may be directed to charging the battery as the battery maximum charging rate and capacity increase, and less energy may be to heat the battery.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
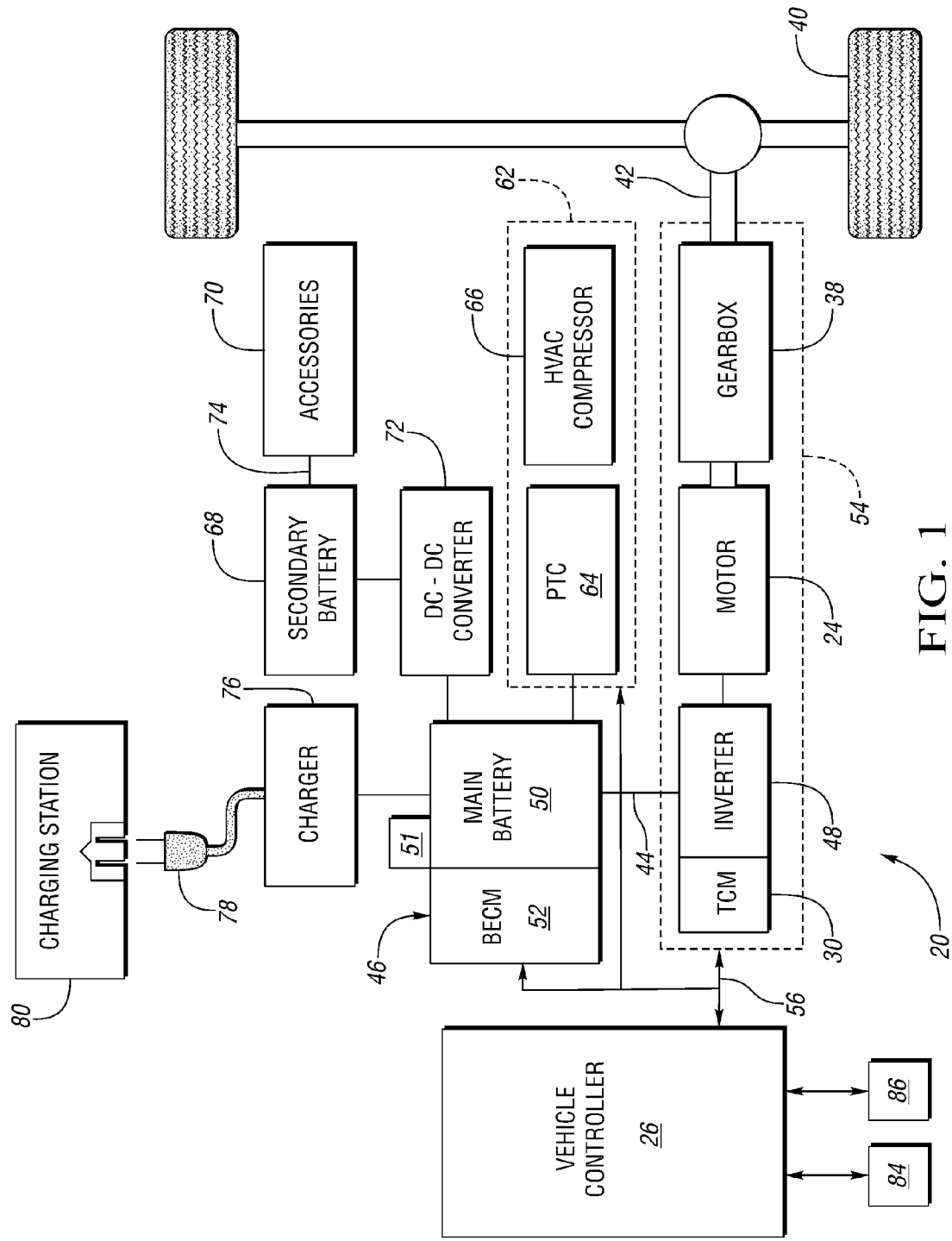
FIG. 1 is a schematic of a battery electric vehicle according to an embodiment.

With reference to FIG. 1, an electric vehicle 20, such as a battery electric vehicle (BEV), is illustrated in accordance with one or more embodiments. FIG. 1 represents only one type of BEV architecture, and is not intended to be limiting. The present disclosure may be applied to any suitable BEV. In other embodiments, the present disclosure may be used with other electric vehicles as are known in the art such as a hybrid electric vehicle with a traction battery that is configured for charging using an external power source, such as a plug-in hybrid electric vehicle (PHEV).

The vehicle 20, or BEV, is an all-electric vehicle propelled through electric power, such as by an electric motor 24, and without assistance from an internal combustion engine. The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 20 include multiple motors (not shown) for propelling the vehicle 20. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The main battery 50 is a high voltage battery, or traction battery, that may output electrical power to operate the motor 24. The main battery 50 is a battery pack made up of one or more battery modules (not shown). In one embodiment, the battery 50 has a single pack or module. In another embodiment, the battery 50 is a split pack design, with two or more packs or modules. The split pack battery may have a first pack and positioned in a region of the vehicle that is exposed to the cabin temperature, and a second pack positioned in a region of the vehicle that is exposed to the external environment temperature and spaced apart from the first pack. The battery 50 may be a lithium family battery (lithium-ion, Li-ion polymer, lithium iron phosphate, or the like), a nickel cadmium battery, a nickel metal hydride battery, a zinc air battery, a lead-acid battery, or the like. Each battery module may contain one battery cell or a plurality of battery cells. The battery cells are heated and cooled using a fluid system, air system, or other method or system as is known in the art.

The BECM 52 acts as a controller for the main battery 50. The BECM 52 includes an electronic monitoring system that manages temperature and state of charge of each of the battery cells. The battery 50 has at least one temperature sensor 51, such as a thermistor, or the like. The sensor 51 is in communication with the BECM 52 to provide temperature data regarding the battery 50.

The motor 24, the transmission control module (TCM) 30, the gearbox 38, and the inverter 48 may be collectively referred to as a transmission 54. The vehicle controller 26 communicates with the transmission 54, for coordinating the function of the transmission 54 with other vehicle systems. The controller 26, BECM 52, and TCM 30 are illustrated as separate controller modules. The control system for the vehicle 20 may include any number of controllers, and may be integrated into a single controller, or have various modules. Some or all of the controllers may be connected by a controller area network (CAN) or other system. The control system may be configured to control operation of the various components of the transmission 54 and the battery 50 under any of a number of different conditions, including in a way that thermally manages the temperature in the battery 50 and manages charging and discharging operations of the battery 50.

The TCM 30 is configured to control specific components within the transmission 54, such as the motor 24 and/or the inverter 48. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request.

The vehicle controller 26 receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions.

The vehicle 20 includes a thermal control system 62 for heating and cooling various vehicle components including the battery 50. The thermal control system 62 includes a high voltage positive temperature coefficient (PTC) electric heater 64 and a high voltage electric compressor 66, according to one or more embodiments. Both the PTC 64 and the compressor 66 may draw electrical energy directly from the main battery 50. The thermal control system 62 may include a controller (not shown) for communicating with the vehicle controller 26 over the CAN bus 56 or may be integrated into the controller 26. The on/off status of the thermal control system 62 is communicated to the vehicle controller 26, and may be based on, for example, the status of an operator actuated switch, or the automatic control of the climate control system 62 based on related functions, such as window defrost.

The vehicle 20 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically disposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 20 includes an alternating current (AC) charger 76 for charging the main battery 50. An electrical connector 78 connects the AC charger 76 to an external power supply 80 for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply 80 (e.g., 110 volt, 220 volt, two phase, three phase, level 1, level 2, etc.) The VSC 26 may be configured to receive information from the BECM 52 or the charger 76 regarding the power, voltage source, and current of a connected external power supply 80. In one or more embodiments, the external power supply 80 includes a device that harnesses renewable energy, such as a photovoltaic (PV) solar panel, or a wind turbine (not shown).

In one embodiment, the battery 50 and charging system 80 operate under SAE Level 2 standards, which are defined as alternating current (AC) single phase between approximately 208-240 volts with a maximum continuous current of thirty-two amps continuous. Of course, other electrical standards are contemplated. In another embodiment, the battery 50 and charging system 80 operate under level 2+ standards, which increase the maximum current to eighty amps with 208-240 volts. This increase in current allows for a higher charge rate, leading to faster charging of the battery 50, but potentially higher energy usages.

Also shown in FIG. 1 are simplified schematic representations of a driver controls system 84 and a power steering system 86. The driver controls system 84 includes braking, acceleration and gear selection (shifting) systems. The braking system includes a brake pedal, position sensors, pressure sensors, or some combination thereof, as well as a mechanical connection to the vehicle wheels, such as the primary drive wheels 40, to effect friction braking. The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g., PRNDL) to the vehicle controller 26.

Figure 2:
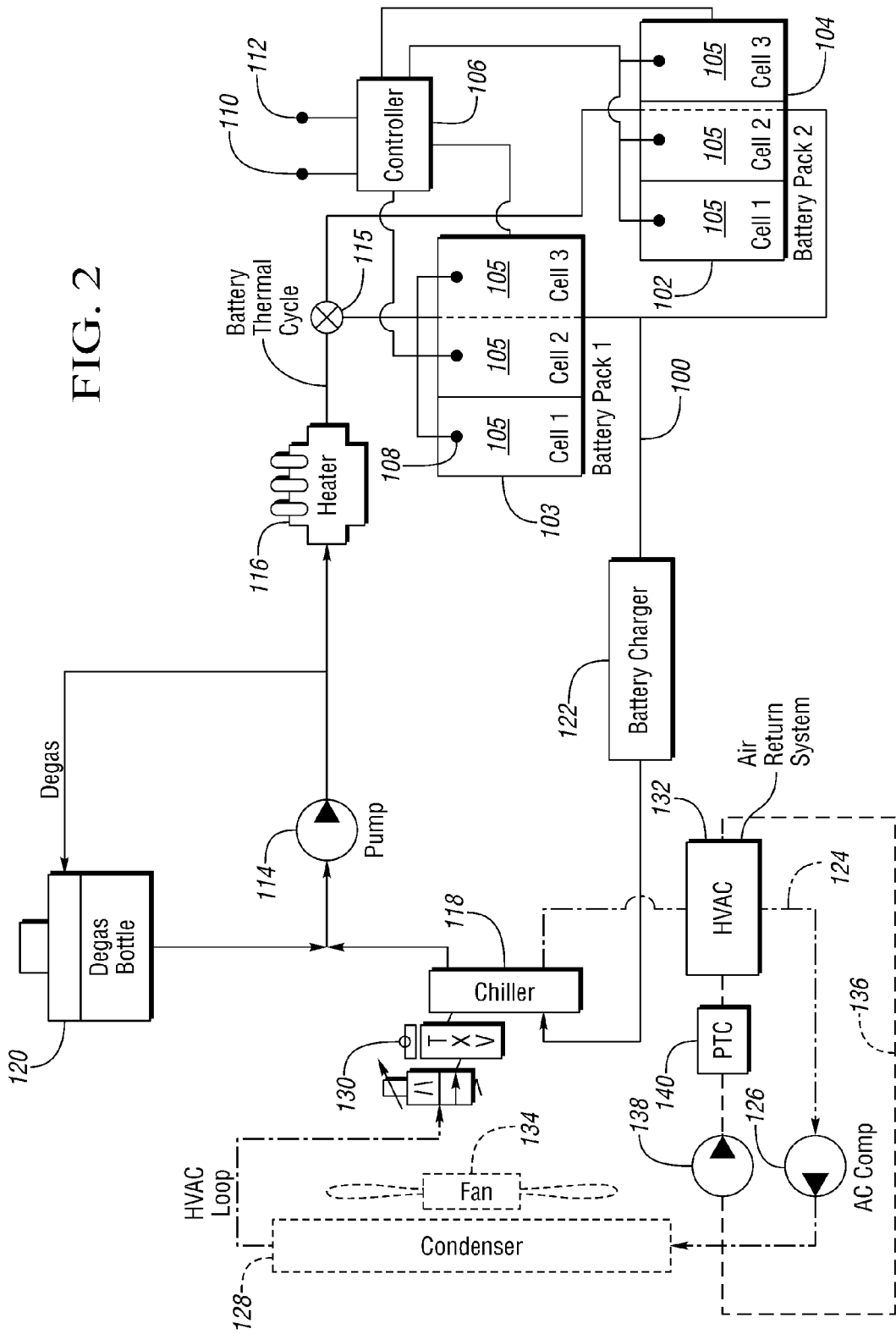
FIG. 2 is a schematic of a battery thermal management system according to an embodiment.

FIG. 2 illustrates a thermal circuit 100 for use with vehicle 20 as shown in FIG. 1. Of course, other thermal systems as are known in the art may be used with vehicle 20 or various embodiment of the disclosure. The battery thermal circuit 100 may heat and cool the traction battery 102. Battery 102 may be the main battery 50 in vehicle 20. Traction battery 102 is made up of one or more battery packs or modules, and a battery 102 having two packs 103, 104 is shown in FIG. 2. Each battery pack 103, 104 may have multiple cells 105. The battery 102 in FIG. 2 has three cells 105 in each pack 103, 104, although any number of cells may be used with either pack 103, 104 or for a battery 102 as is known in the art.

The controller 106, which may be a vehicle controller in communication with or integrated with the BECM 52, monitors the battery 102 to determine the state of charge and capacity of the battery 102. The state of charge of the battery is usually based on percentage points and represents how "full" or "empty" the battery is to a user. The state of charge may be calculated using various methods, for example, by a compensated calibrated curve based on voltage, current integration. The battery capacity is the amount of electric charge that the battery is capable of storing, i.e. the number of Amphours. The battery capacity is temperature dependent, and at low battery temperatures the battery capacity may decrease such that the battery stores a reduced amount of electric charge. The charge rate of the battery is the rate at which that battery can be charged, for example, in Amps per hour. As the temperature of the battery decreases, the maximum charge rate for a battery also decreases.

Each cell 105 may have an associated temperature sensor 108 that is configured to measure the respective cell 105 temperature. The temperature sensor 108 is in communication with the controller 106 such that the controller 106 also monitors the battery 102 temperature by monitoring each cell 105 temperature. The controller 106 determines the temperature of the battery 102 by measuring or estimating the temperatures of the various battery cells 104. Alternatively, the controller 106 may use the most limiting cell temperature as the battery temperature.

The controller 106 is also in communication with an ambient temperature sensor 110 on the vehicle. The ambient temperature sensor 110 is configured to measure the temperature of the ambient environment, i.e. outside air. A cabin temperature sensor 112 is also in communication with the controller 110 and measures the temperature of the vehicle 20 passenger cabin to provide feedback for the HVAC system for climate control of the cabin.

The battery 102 may have its temperature actively regulated using the thermal circuit 100 controlled by controller 106. The temperature of the battery 102 and of each cell 105 determines the amount of charge that the battery 102 may accept, the amount of charge available for use and stored in the battery, and the rate at which the battery may be charged.

The thermal circuit 100 thermally manages the battery 102 to regulate cell 105 temperatures to maintain the battery 102 useful life, permit a proper charge, and meet vehicle performance attributes. The thermal circuit 100 provides active heating or active cooling via liquid heat transfer with the battery 102. The battery thermal circuit 100 may be integrated into a vehicle thermal system having both climate control heating and cooling elements and powertrain cooling elements.

The thermal circuit 100 contains a fluid that cycles through cooling channels adjacent to the cells 105 in the battery to heat or cool the battery 102 using conductive and convective heat transfer. A pump 114 controls the flow of the fluid in the circuit 100. One or more valves, such as valve 115 may be used to control the proportion of fluid to the first pack 103 and second pack 104, which in turn may provide for thermal management and controlled heating or cooling of the individual packs 103, 104. A heating element 116 acts as a thermal source for the fluid to heat the fluid, thereby actively heat the battery 102. The heating element may be a heat exchanger with another thermal system in the vehicle to recover waste heat, or may be a stand-alone heater, such as an electrically powered heater including a positive temperature coefficient (PTC) heater. The heating element 116 may be heater 64 as shown in FIG. 1.

The battery thermal circuit 100 also has a chiller element 118, or thermal sink, that cools the fluid which in turn may actively cool the battery 102. The chiller may be part of a vapor compression or absorption cycle, a heat exchanger with another element in the vehicle thermal systems, or other thermal sink as is known in the art. Heat exchangers in the system may be co-flow, counterflow or other heat exchangers as are known in the art to appropriately heat or cool the fluid in the circuit 100.

The circuit 100 has a degas bottle 120 to remove air from the fluid in the vehicle thermal circuit including circuit 100 and any other vehicle thermal systems and increase the thermal efficiency of the circuit 100. The degas bottle 120 may be an air trap, separator, or other device as is known in the art. The degas bottle 120 may also act as a fill location to add additional fluid to the circuit 100 as needed, such as during a service event.

The battery thermal circuit 100 may also flow through the battery charger 122 to actively heat or cool the charger 122 and charging components. Battery charger 122 may be charger 76 in vehicle 20 as shown in FIG. 1.

The air conditioning circuit 124 of the HVAC system for the vehicle, or climate control system for the vehicle passenger cabin, is illustrated as having a common chiller 118 with the battery circuit 100. Of course, the air conditioning circuit 124 may be separate from the battery circuit 100, be integrated further with the battery circuit 100, or have other system architectures. The air conditioning circuit 124 has a fluid loop with a compressor 126, a condenser 128, a throttle 130, and the chiller 118 to provide cooled fluid to the HVAC air return system 132 to provide cool air to the cabin vents. Air flows over the condenser 128 from a fan 134. The compressor 126 may be compressor 66 as shown in FIG. 1.

A heating system 136 is also provided for the cabin HVAC system 132. A heating circuit 136 may be integrated with the air conditioning circuit 124, the battery thermal circuit 100, or be a separate system. The heating circuit 136 may be a fluid system. In one embodiment, the thermal circuit 136 has a heating element 140 that heats the fluid in the circuit 136 to then provide warm fluid to the HVAC system heat exchanger 132. The heating system may have a return loop to reheat cabin air, and may also have a fresh air intake to add additional outside air to the cabin. In one embodiment, the heating element 140 is a PTC heater, and may be heater 64 as shown in FIG. 1.

Figure 3:
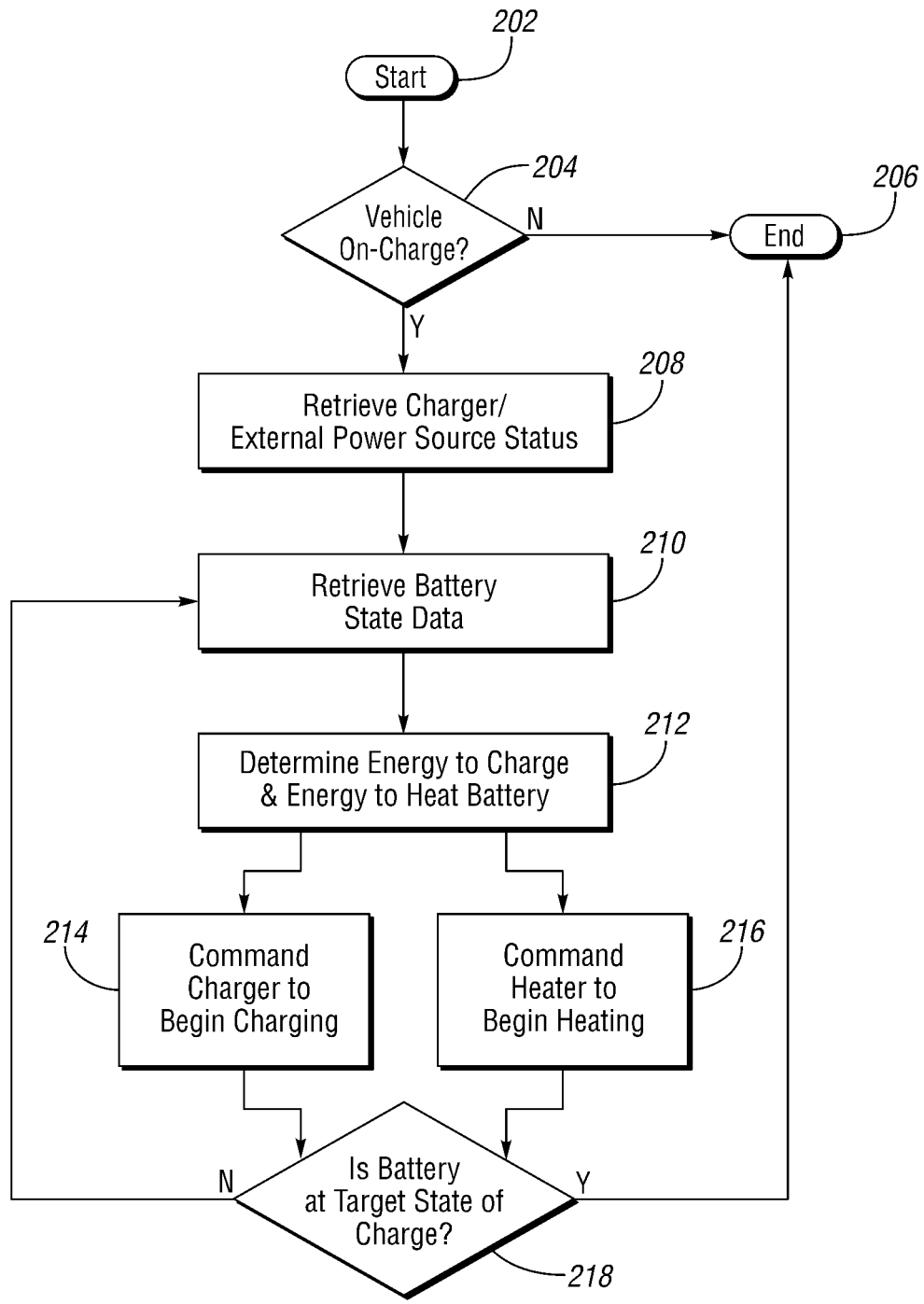
FIG. 3 is a flow chart illustrating a control algorithm according to an embodiment.

FIG. 3 illustrates a flow chart for controlling the vehicle 20 while the vehicle 20 is connected to an external power source, or is "on-charge", and shows an overall control algorithm 200 for thermal management of the vehicle 20. The method may also be implemented with other hybrid vehicles having a traction battery that is configured to be charged using an external power source or power supply. Additionally, various steps in the flow chart may be rearranged or omitted, and other steps may be added, while remaining within the spirit and scope of the disclosure.

The controller 26 initiates the algorithm at 202. At 204, the controller 26 determines if the vehicle 20 is connected to a charger and external power source 80, for example, after a vehicle shut down event. When the vehicle 20 is on-charge the vehicle 20 is connected to the charging station 80 and may be receiving power therefrom. If the vehicle is not on-charge at 204, the algorithm ends at block 206. If the vehicle is on-charge at 204, the algorithm proceeds to block 208.

At block 208, the controller 26 retrieves the status of the charger 76 and external power source 80. The controller 26 may determine the maximum power, maximum voltage, and maximum current available from the charging station 80 for use in charging the vehicle 20.

The algorithm 200 then retrieves information regarding the battery 50 state at 210, for example, from the BECM 52. Various battery states may be retrieved or inferred, including: the present temperature of the battery, the present battery 50 capacity, the present SOC, a target SOC, and the energy needed to charge the battery 50 based on the present SOC. The temperature of the battery 50 is measured using temperature sensors 108 in the various battery cells 105, or alternatively, the temperature of the battery 50 may be estimated. The controller 26 may use the most limiting cell 105 temperature, i.e. the coldest cell temperature, as the battery 50 temperature.

The battery 50 has a charging temperature range. Generally, low temperature thresholds for charging the battery 50, or the low end of the charging temperature range, may be in the range of ten degrees Celsius to minus forty degrees Celsius. When the battery 50 temperature is below the low temperature threshold, the maximum charging current that the battery can accept may be reduced. The charging current for the battery 50 is limited by the cell 105 having the lowest temperature when any cell 105 temperature is below the low temperature threshold. High temperature thresholds for the charging temperature range of the battery 50 are in the range of thirty degrees Celsius to sixty degrees Celsius.

Within a charging temperature range, the battery 50 may be charged to full capacity. The charging temperature range for the battery 50 has the lower target temperature or threshold at which a full charge of the battery in a cold ambient temperature may be obtained with normal operating performance delivered to the vehicle. When the battery 50, or a cell in the battery, goes below the threshold, the battery capacity may be reduced, and the charging current may also need to be reduced. For example, if one of the cells 105 has a temperature below a low temperature threshold for the battery, the controller 26 may use this temperature in the control strategy and algorithm 200.

The algorithm 200 proceeds to block 212 and determines the amount of energy from the charger that is to be used for charging the battery 50, and the amount of energy that is to be used for heating the battery 50. Based on the lowest cell temperature, the charging rate of the battery 50 may be limited or restricted, and the charge capacity of the battery 50 may be reduced. The controller 26 determines the charging rate that is appropriate for use with the battery in its present state. The controller 26 may reference a sub-routine, algorithm, calibration table, or the like in order to make these determinations and calculations. The controller 26 arbitrates heating and charging the battery 50 based on input charge available from the charger and the electrical and thermal state of the battery 50. The controller 26 determines the portion of energy to be used for charging the battery and the portion of energy to be used for heating the battery based on the battery temperature. The algorithm 200 may optimize the balance of energy directed to charging the cells and the energy directed to heating the cells to maximize energy into the cells of the battery.

For example, when the cells 105 are cold and/or approaching their maximum SOC or capacity at a given temperature, the rate of charge energy the cells can accept is limited. Given a charger capable of providing X watts to the cells, the cells may only be able to accept Y watts where Y is less than X based on the cells temperature and SOC acting as a limiting factor. The controller 26 may calculate the total amount of energy available for charging from the charger, and divert energy towards heating the battery to adjust the maximum SOC point of the battery, or in other words, increase the maximum battery capacity. For example, given a 3.3 kW charger 76, a battery 50 system at −25 Celsius may only be able to accept energy at 1.5 kW, as the temperature causes a restricted maximum rate of charge for the battery. The algorithm 200 may direct 1.8 kW of energy to heat the battery 50 and use the remaining 1.5 kW to charge the battery at its maximum rate for the present state. As the battery heats (say to −15 Celsius) the cells capacity and maximum charging rate will increase, and more energy from the charger may be used to charge the battery with less energy being diverted to heating the battery.

After the controller 26 determines the amount of energy from the charger for charging the battery and for heating the battery, respectively, the controller 26 may simultaneously heat the battery 50 and charge the battery 50. At 214, the controller 26 commands the charger to begin charging the battery using the amount of energy from the charger as determined at block 212. At 216, the controller 26 commands the thermal system 100 to begin heating the battery using the amount of energy from the charger as determined at block 212. These steps 214, 216 are shown in parallel and may occur simultaneously or at approximately the same time. Although the blocks 214 and 216 are illustrated as occurring in parallel, they may also be commanded sequentially with either occurring first.

The algorithm 200 then proceeds from blocks 214 and 216 to block 218 where the controller 26 determines if the battery 50 is at a target SOC. The target SOC may be a maximum SOC, or full capacity for the battery. The target SOC may also be a value set by a user or by the controller 26 in another control strategy for the vehicle. If the battery has reached the target SOC, the algorithm 200 ends at 206.

If the battery has not reached the target SOC at 218, the algorithm 200 returns to block 210, or an earlier block. The algorithm 200 retrieves a updated battery and cell temperature, and battery state, and may adjust or modify the amount of energy directed to charging and the amount of energy directed to heating the battery. As the battery is heated, a larger portion of energy from the charger may be directed to charging the battery as the battery maximum charging rate and capacity increase, and less energy may be directed to heat the battery.

Figure 4:
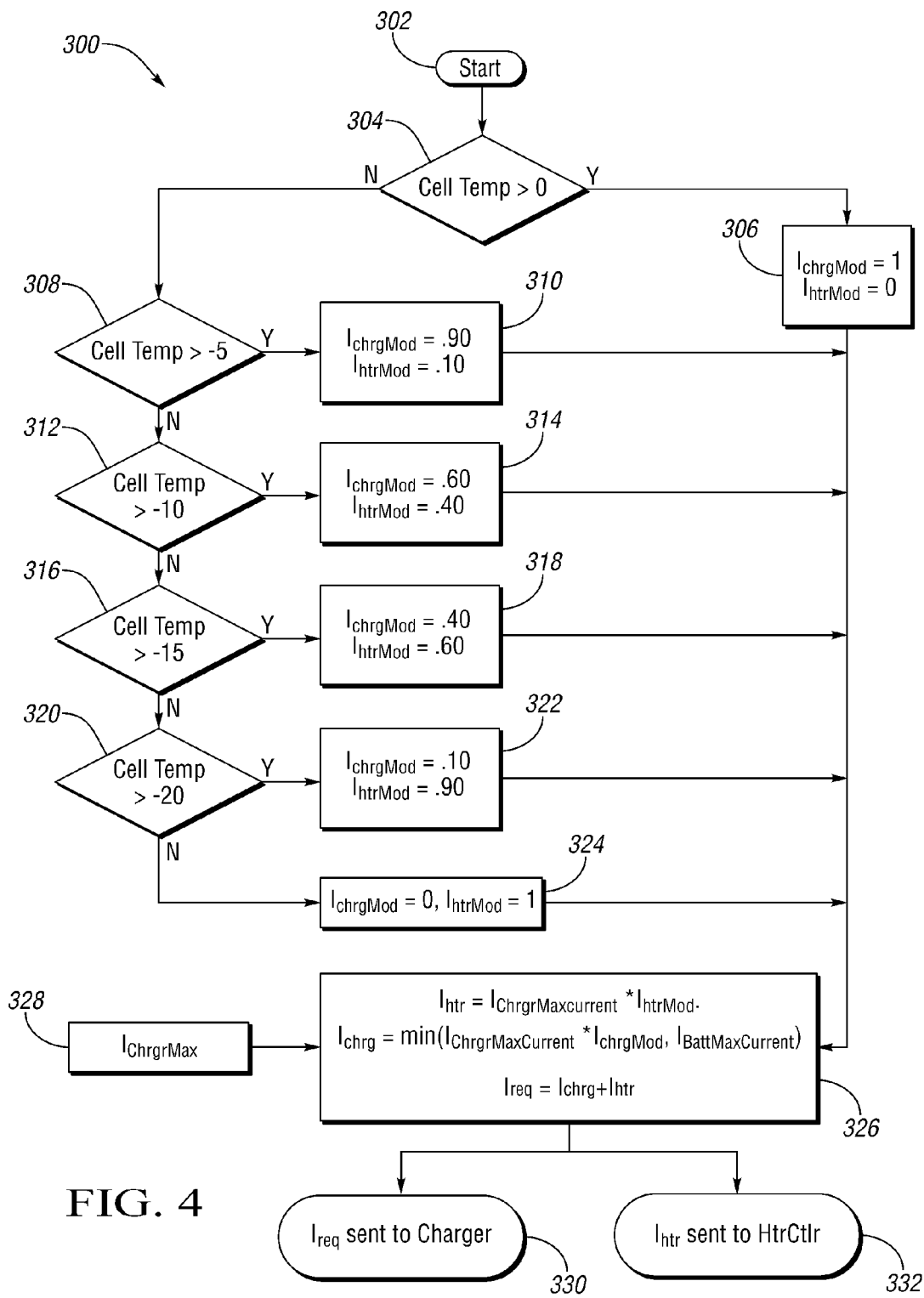
FIG. 4 is a flow chart illustrating a temperature compensated current schedule according to an embodiment for use with the control algorithm of FIG. 3.

FIG. 4 illustrates an algorithm 300 for use with the algorithm 200 at block 212 of FIG. 3, for example, as a sub-routine. The algorithm 300 references various temperature thresholds. These temperature thresholds are according to an example and are non-limiting. Other temperature thresholds may be used in other embodiments. For example, temperature thresholds may be selected based on the battery chemistry and other battery or vehicle characteristics. The algorithm 300 starts at 302. The controller 26 proceeds to determine if all of the cell 105 temperatures are above a first threshold, T1, shown as zero degrees Celsius, at 304. This first threshold may be set as the low temperature threshold of the charging temperature range of the battery. If there is no cell 105 in the battery 50 having a temperature below T1, the algorithm 300 proceeds to block 306, where the controller 26 sets $I_{chrgMod}$ and $I_{htrMod}$. $I_{chrgMod}$ and $I_{htrMod}$ are fractions used to proportion the energy from the charger between charging and heating the battery. The fraction values used in FIG. 4 are according to one embodiment, and other values may be used in other embodiments. Since the battery temperature is within the charging temperature range at block 306, no energy from the charger needs to be directed to heating the battery, and so $I_{chrgMod}$ is set to one and $I_{htrMod}$ is set to zero.

If a cell 105 in the battery is below T1, the algorithm 300 proceeds to 308 where it determines if there are any cells 105 with a temperature below a second threshold, T2, shown as −5 Celsius. If there are no cells 105 below T2, the algorithm 300 proceeds to block 310 and sets $I_{chrgMod}$ and $I_{htrMod}$ as shown. Here the temperature of the coldest cell 105 lies in a window between T1 and T2, and so the battery 50 is just below the low temperature threshold of the charging temperature range. Most of the energy may be directed toward charging and less energy is required to heat the battery as it is very near to the charging temperature range. At 310, $I_{chrgMod}$ is set to 0.9 and $I_{htrMod}$ is set to 0.1, so that the sum of the two fractions totals one.

If a cell 105 in the battery is below T2, the algorithm 300 proceeds from 308 to 312 where it determines if there are any cells 105 with a temperature below a third threshold, T3, shown as −10 Celsius. If there are no cells 105 below T3, the algorithm 300 proceeds to block 314 and sets $I_{chrgMod}$ as 0.6 and $I_{htrMod}$ as 0.4 as shown.

If a cell 105 in the battery is below T3, the algorithm 300 proceeds from 312 to 316 where it determines if there are any cells 105 with a temperature below a fourth threshold, T4, shown as −15 Celsius. If there are no cells 105 below T4, the algorithm proceeds to block 318 and sets $I_{chrgMod}$ as 0.4 and $I_{htrMod}$ as 0.6 as shown. Note that at block 318 the fraction of energy directed to heating the battery 50 is now larger than the fraction of energy directed to charging the battery.

If a cell 105 in the battery 50 is below T4, the algorithm 300 proceeds from 316 to 320 where it determines if there are any cells 105 with a temperature below a fifth threshold, T5, shown as −20 Celsius. If there are no cells 105 below T5, the algorithm 300 proceeds to block 322 and sets $I_{chrgMod}$ as 0.1 and $I_{htrMod}$ as 0.9 as shown, to direct more energy from the charger to heating the battery.

If a cell 105 in the battery 50 is below T5, the algorithm 300 proceeds from 320 to 324 where it sets $I_{chrgMod}$ as zero and $I_{htrMod}$ as one as shown, to direct all of the energy from the charger to heating the battery as the battery is now too cold to charge in a practical manner.

The algorithm 300 then proceeds to block 326 from one of blocks 306, 310, 314, 318, 322, or 324. At 326, the controller uses the maximum current available from the charger, $I_{chrgMax}$ as an input from 328. The controller 26 calculates a current to be used for charging the battery at 326 as:

$$I_{chrg} = \min(I_{ChrgrMaxCurrent} * I_{chrgMod}, I_{BattMax})$$

where the charging current, $I_{chrg}$, is the minimum of Ibattmax, the maximum current that the battery can accept in its present state, or $I_{chrgrMod} * I_{chrgrMax}$ which is the charging fraction times the maximum current available from the charger.

The controller calculates a current to be used to heat the battery as:

$$I_{htr} = I_{chrgrMax} * I_{htrMod}$$

where the heating current, $I_{htr}$, is the heating fraction times the maximum current available from the charger.

The controller then determines the current to be requested from the charger, $I_{req}$, as the sum of the charging current and the heating current, or:

$$I_{req} = I_{chrg} + I_{htr}$$

The algorithm proceeds from block 326 to request $I_{req}$ from the charger at 330 and command the thermal circuit 100 to provide $I_{htr}$ at 332.

Various embodiments have associated, non-limiting advantages. For example, a controller arbitrates the heating and charging a battery based on input charge available and the state of the battery. The controller determines the portion of energy to be used for charging the battery and the portion of energy to be used for heating the battery based on the battery temperature. A control algorithm may optimize the balance of energy directed to charging the cells and the energy directed to heating the cells to maximize energy into the cells of the battery. As the battery is heated, a larger portion of energy from the charger may be directed to charging the battery as the battery maximum charging rate and capacity increase, and less energy may be to heat the battery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
a traction battery having a plurality of cells, the traction battery having a first pack exposed to a cabin temperature and a second pack spaced apart from the first pack and exposed to an external environmental temperature;
a thermal circuit connected to the traction battery, and having a thermal source, a thermal sink, and a valve system; and
a controller connected to the traction battery and the thermal circuit, the controller configured to: (i) charge the traction battery using a maximum charging current based on a lowest temperature cell while the traction battery is connected to a charger and external power source, (ii) heat the traction battery if the lowest temperature cell is below a predetermined temperature while the traction battery is charging, and (iii) control the valve system to bias heating to the pack having the lowest cell temperature.

2. The vehicle of claim 1 wherein the controller is configured to receive a maximum available current from the charger and external power source.

3. The vehicle of claim 2 wherein the maximum charging current is less than the maximum current from the charger and external power source.

4. The vehicle of claim 3 wherein the controller is configured to heat the traction battery using a current equal to the difference between the maximum available current and the maximum charging current.

5. The vehicle of claim 1 wherein the thermal source of the thermal circuit comprises an electric heater.

6. A method of controlling an electric vehicle comprising:
detecting if a traction battery is connected to a charger and external power source;
measuring cell temperatures in the traction battery to determine a lowest temperature cell;
charging the traction battery using a maximum charging current associated with the lowest temperature cell while the traction battery is connected to the charger and external power source; and
heating the traction battery using a current equal to the difference between a maximum available current from the charger and the maximum charging current if the lowest temperature cell is below a predetermined temperature while the traction battery is charging
wherein the maximum charging current associated with the lowest temperature cell is a percentage of the available current from the charger;
wherein the lowest cell temperature is within one of a series of temperature ranges, the series of temperature ranges being defined by a series of temperature thresholds, each temperature range having an associated percentage; and
wherein the percentage is a constant predetermined value within each temperature range, and decreases as the temperature range decreases.

7. The method of claim 6 wherein the maximum charging current associated with the lowest temperature cell is the minimum of one of a maximum current for the lowest temperature cell and a percentage of the available current from the charger.

8. The method of claim 6 wherein the maximum charging current is less than the maximum available current from the charger and external power source if the lowest temperature is below the predetermined temperature.

9. The method of claim 6 wherein charging the traction battery and heating the traction battery are conducted simultaneously.

10. The method of claim 6 further comprising adjusting the maximum charging current as the traction battery is heated and the temperature of the lowest temperature cell increases.

11. The method of claim 6 wherein the percentage is based on cell temperature.

12. A method for controlling an electric vehicle while connected to a charger, comprising, in response to a low cell temperature in a traction battery, charging the battery using a first portion of power from the charger while heating the battery using a second portion of power from the charger, the first and second portions a function of a series of predetermined percentages of power from the charger defined by a series of low temperature thresholds.

13. The method of claim 12 further comprising measuring a temperature for each cell in the battery to determine the low cell temperature.

14. The method of claim 12 further comprising estimating a temperature for each cell in the battery to determine the low cell temperature.

15. The method of claim 12 wherein the series of low temperature thresholds provides a series of temperature ranges, each temperature range having an associated percentage in the series of predetermined percentages of power.

16. The method of claim 15 wherein the percentage within each temperature range in the series of temperature ranges is a constant predetermined value.

17. The method of claim 15 wherein each percentage in the series of predetermined percentages of power decreases as the low temperature thresholds decrease in value thereby providing a decreasing first portion of power with decreasing temperature.

18. The method of claim 12 further comprising biasing heating to a pack in the traction battery with the low cell temperature, the traction battery having at least two packs.

* * * * *